United States Patent

Sakaegi

Patent Number: 6,040,856
Date of Patent: *Mar. 21, 2000

[54] ELECTRONIC CAMERA CAPABLE OF PERFORMING PHOTOGRAPHY AND CHARACTER RECOGNITION

[75] Inventor: Yuji Sakaegi, Yokohama, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/732,683

[22] Filed: Oct. 18, 1996

Related U.S. Application Data

[63] Continuation of application No. 08/330,999, Oct. 28, 1994, abandoned.

[30] Foreign Application Priority Data

Oct. 29, 1993 [JP] Japan ..................................... 5-272116

[51] Int. Cl.[7] ....................................................... H04N 5/76
[52] U.S. Cl. ............................................ 348/232; 348/207
[58] Field of Search ................................... 348/232, 207, 348/231; 358/906

[56] References Cited

U.S. PATENT DOCUMENTS

| | | |
|---|---|---|
| 4,500,776 | 2/1985 | Laser . |
| 4,574,319 | 3/1986 | Konishi . |
| 4,853,733 | 8/1989 | Watanabe et al. . |
| 5,039,847 | 8/1991 | Morii et al. . |
| 5,170,069 | 12/1992 | Sakai ......................................... 307/43 |
| 5,223,942 | 6/1993 | Sakaegi et al. .......................... 358/310 |
| 5,237,156 | 8/1993 | Konishi et al. . |
| 5,335,072 | 8/1994 | Tanaka et al. . |

FOREIGN PATENT DOCUMENTS

| | | | |
|---|---|---|---|
| 0323194 | 7/1989 | European Pat. Off. . | |
| 4-32375 | 2/1992 | Japan ............................. H04N 5/225 |
| 5-219430 | 8/1993 | Japan ............................. H04N 5/232 |

*Primary Examiner*—Tuan Ho
*Assistant Examiner*—Aung S. Moe
*Attorney, Agent, or Firm*—Fitzpatrick, Cella, Harper & Scinto

[57] ABSTRACT

An electronic camera includes an image pickup device for receiving an image and outputting an image signal corresponding thereto. A connector is provided for receiving a control program from an external source. A memory is provided for permanently storing a built-in control program, and for temporarily storing the external source control program. A selection device is provided for designating one of the stored built-in control program and the external source control program. Signal processing circuitry is provided for processing the image signal output from the image signal pickup means in accordance with the control program designated by the selection means. Preferably, the built-in control program is a photography program, and the external source control program is a character recognition control program. Accordingly, the electronic camera is capable of performing both photography and character recognition functions.

4 Claims, 9 Drawing Sheets

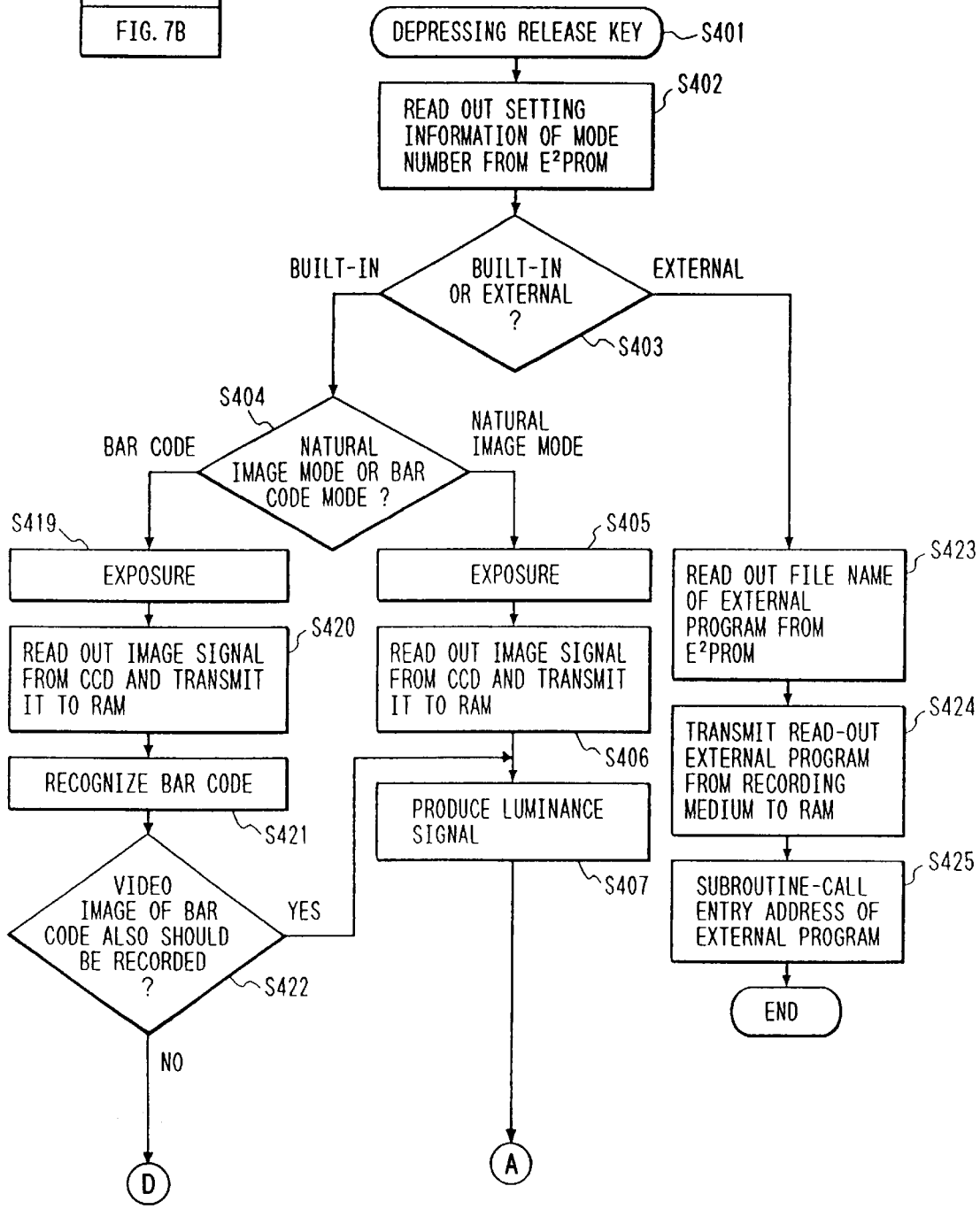

ELECTRONIC CAMERA CAPABLE OF PERFORMING PHOTOGRAPHY AND CHARACTER RECOGNITION

This application is a continuation of Application Ser. No. 08/330,999 filed Oct. 28, 1994, now abandoned.

BACKGROUND OF THE INVENTION

1. Field of the Invention

The present invention relates to an electronic camera.

2. Related Background Art

A prior art electronic camera for digital recording is constructed as shown in FIG. 1.

In FIG. 1, an image passed through an optical lens 1 is picked up by an image pick-up device 32 and processed for CDS or AGC by a circuit 33, and amplified to a predetermined level by a pre-amplifier circuit 34. Then, the signal is passed through an A/D conversion circuit 5, a processing circuit 5' and is temporarily stored in a memory 36. It is compressed by a compression circuit 37 before it is recorded on a medium 38. Numeral 39 denotes a memory controller and numeral 40 denotes a system controller.

The electronic camera of this construction is sufficient to "photograph" an image but has a limitation as an apparatus for acquiring further information. Namely, since it does not provide information as to detailed information of the "photograph", a memory or memorandum of a photographer is required when the "photograph" is to be subsequently processed or edited, which significantly reduces efficiency.

In such a prior art electronic camera, the contents of the control process of the system controller is fixed on a ROM as firmware, and the purpose photograph-recording of the camera is predetermined when it is manufactured in a plant, and it cannot meet various sorts of requirements.

SUMMARY OF THE INVENTION

It is an object of the present invention to solve the problems encountered in the prior art electronic camera.

It is another object of the present invention to allow information other than a "photograph" to be included in an image file and to allow the generation of various sorts of information without fixing a generation method in firmware.

An embodiment of the present invention comprises a memory having a main file area such as an image file for recording an image, and an attribute file area for recording an attribute. It further comprises means for selecting and storing camera control programs for image information recording in the respective areas. The selected control program may be a built-in program or an externally supplied program. Means may also be provided for transferring the control program from recording medium when the external program is selected, and for controlling the camera in accordance with the transferred program.

Thus, information describing the image such as merchandise management information represented by a bar code or title and names derived by character recognition can be easily linked to a target image so that the apparatus is very useful as an input device for later retrieving or information-managing the image.

Other objects and features of the present invention will be apparent from the following description of the invention and the accompanying drawings.

BRIEF DESCRIPTION OF THE DRAWINGS

FIG. 7, comprising FIGS. 7A and 7B, shows a flow chart of an operation at camera release.

DETAILED DESCRIPTION OF THE PREFERRED EMBODIMENTS

Figure 1:
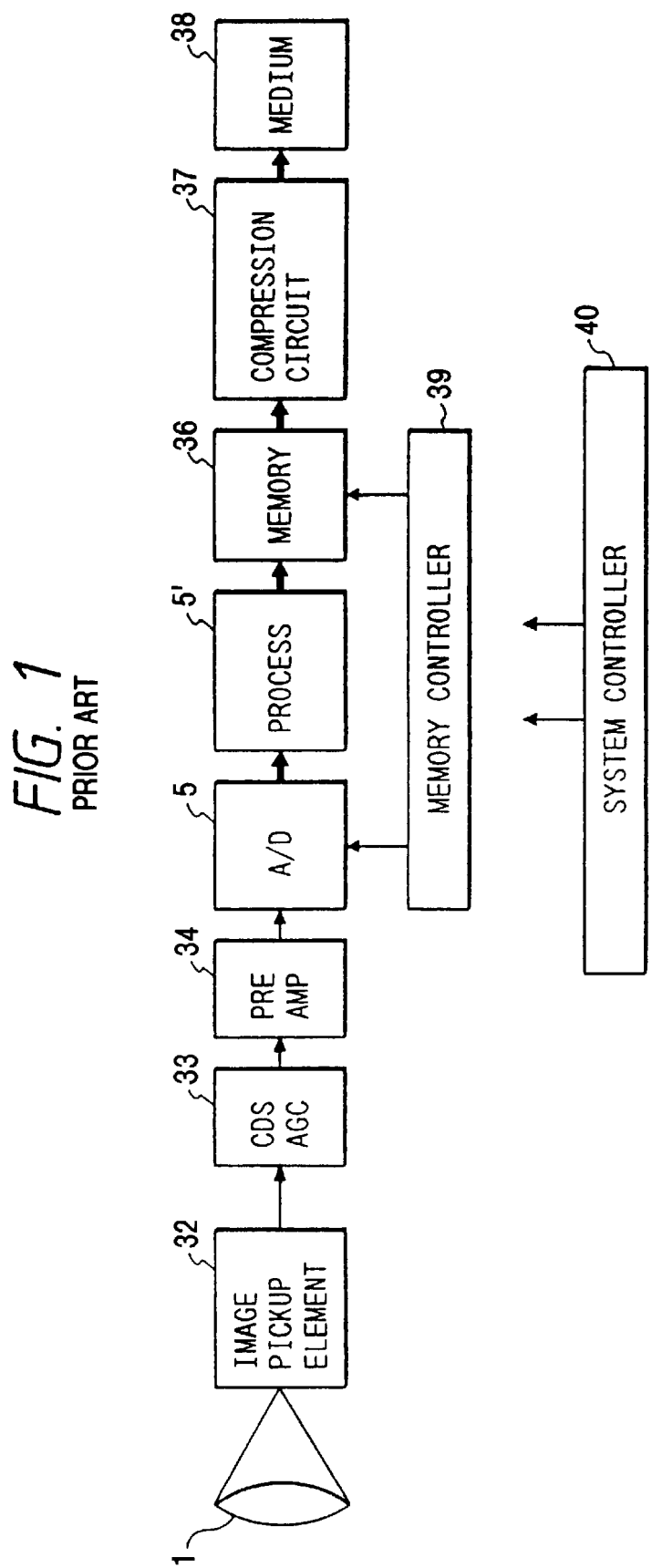
FIG. 1 shows a configuration of a prior art electronic camera.
Figure 2:
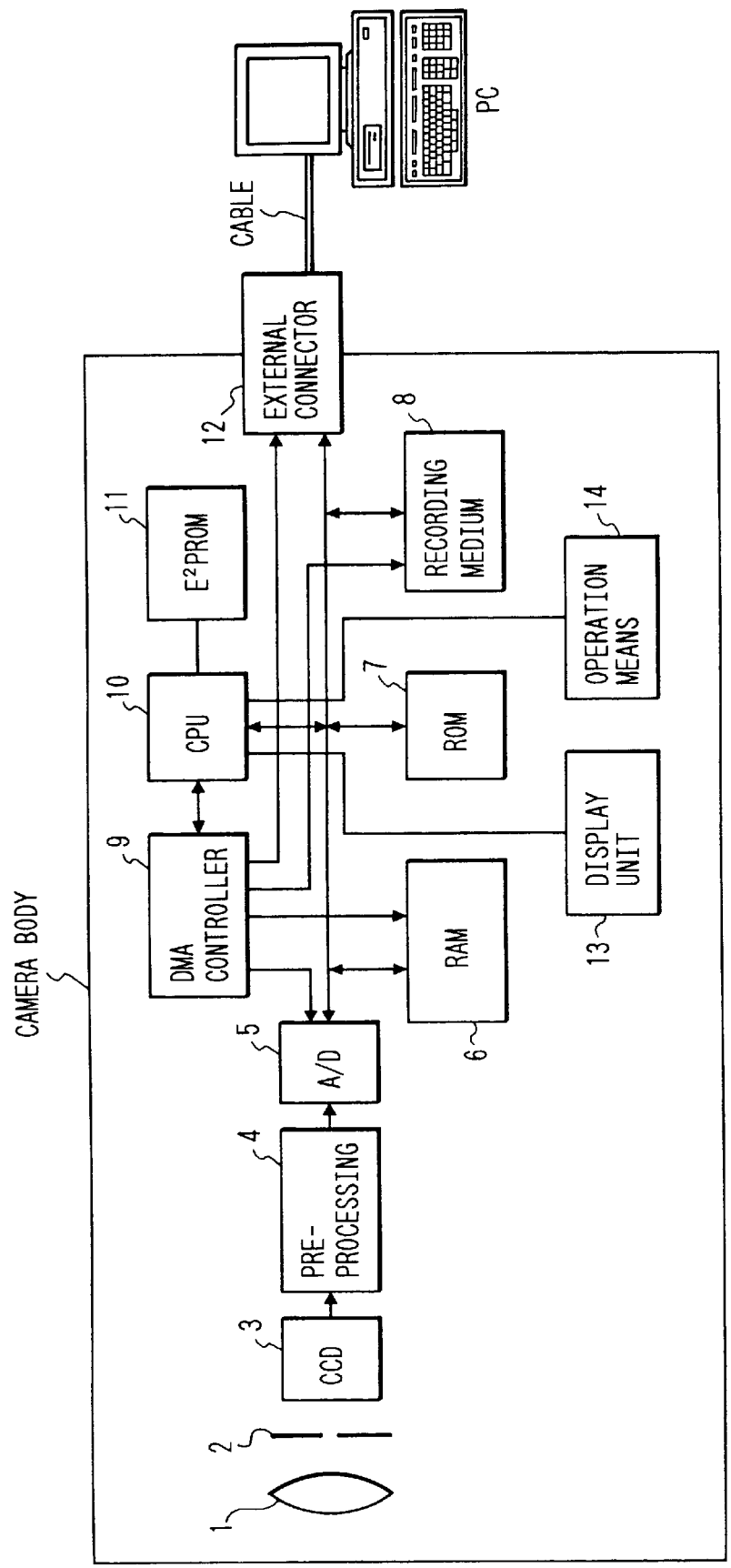
FIG. 2 shows a block diagram of an embodiment of the present invention.

FIG. 2 shows a first embodiment, in which numeral 1 denotes an optical system for focusing an optical image of an object to be picked up, numeral 2 denotes a diaphragm/shutter for attaining proper exposure, numeral 3 denotes a CCD for converting the focused optical image to an electrical signal, numeral 4 denotes a pre-processing circuit for correcting and amplifying an output from the CCD, numeral 5 denotes an AD converter for converting a video signal to a digital signal, numeral 6 denotes a writable electric memory, numeral 7 denotes a read-only memory, numeral 8 denotes a recording medium for recording the video signal thereon, numeral 9 denotes a direct memory access (DMA) controller for transferring the digital data, numeral 10 denotes a CPU for controlling the system and for processing the image data, numeral 11 denotes a writable non-volatile memory, numeral 12 denotes an external connector for exchanging information with an external device such as a PC, numeral 13 denotes a display for displaying an operation state of the camera to a user, and numeral 14 denotes a console unit for entering an instruction from the user.

When the camera of the present invention is used, the user first sets the operation thereof.

In setting the operation, the external connector 12 is connected with a personal computer PC through a cable and the setting is made by using a setting program on the PC.

Figure 3:
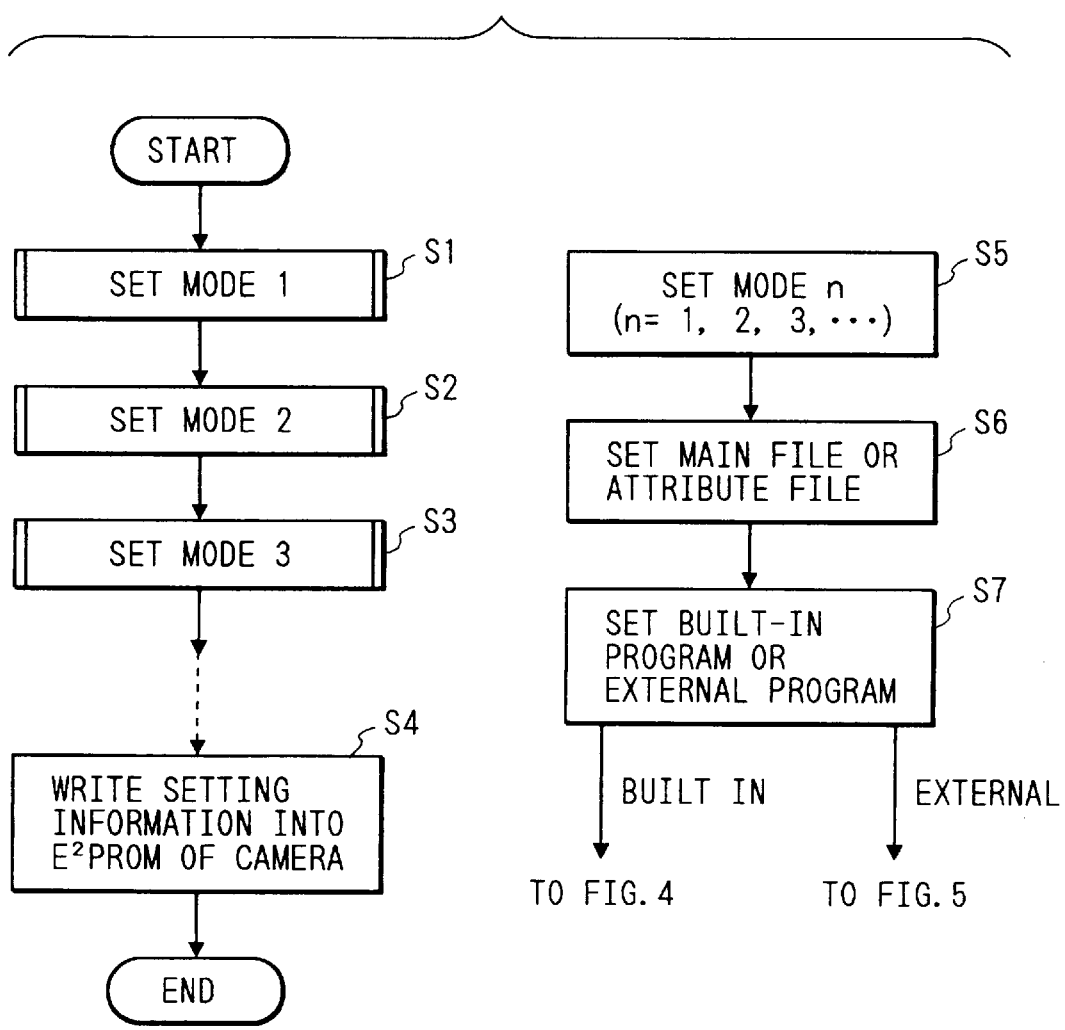
FIG. 3 shows a flow chart of a control program.
Figure 4:
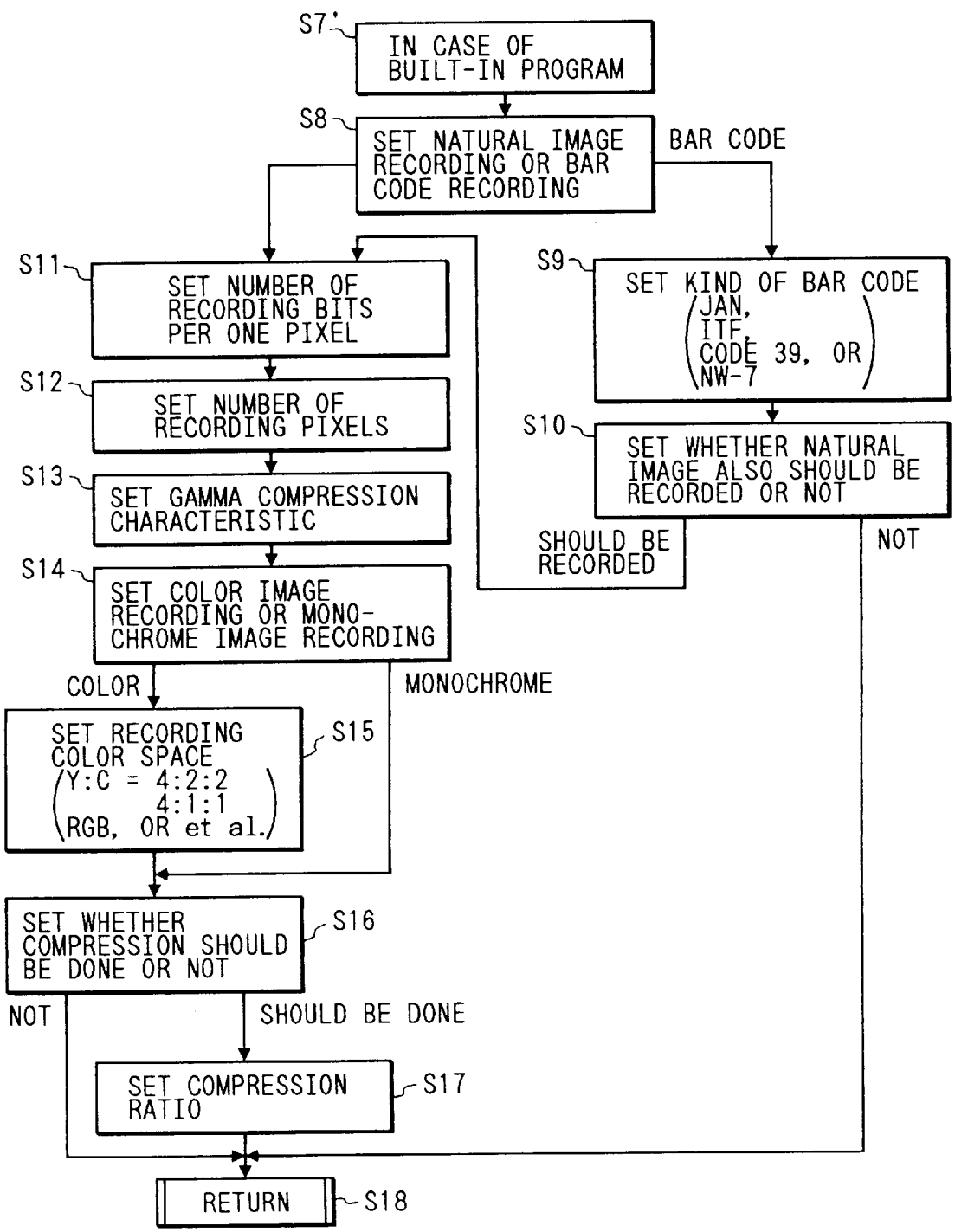
FIG. 4 shows a flow chart continued from FIG. 3.

FIG. 3 shows a flow chart of the setting program run on the PC. By using this program, the operation mode of the camera of the present invention may be sequentially set starting from a mode 1 (S1).

Whether a result of the process in the set mode (S5) is a main file (image file) or an attribute file is set (S6).

Whether a program for carrying out the operation mode is built into the camera or is an externally-supplied program is set (S7), and if it is built-in (S7'), whether it is a natural image recording or a bar code recording operation is set (S8), and if it is a bar code recording operation, a type of the bar code such as JAN code, Code 39 or NW-7 is determined (S9). Whether the natural image is also to be recorded or not is set (S10), if it is the natural image recording operation in S8, the number of recording bits per pixel is set (S11). The number of recording pixels is then set (S12), a gamma compression characteristic is thereafter set (S13), whether it is a color image is set in step S14 or a monochromatic image, and if it is a color image, color spaces for recording ($Y:C_1:C_2$=4:2:2 or 4:1:1 or RGB) are set (S15). Then, in S16, whether it is to be compressed or not is set, and when it is to be compressed, a compression factor is set in S17 and the process returns (S18).

Figure 5:
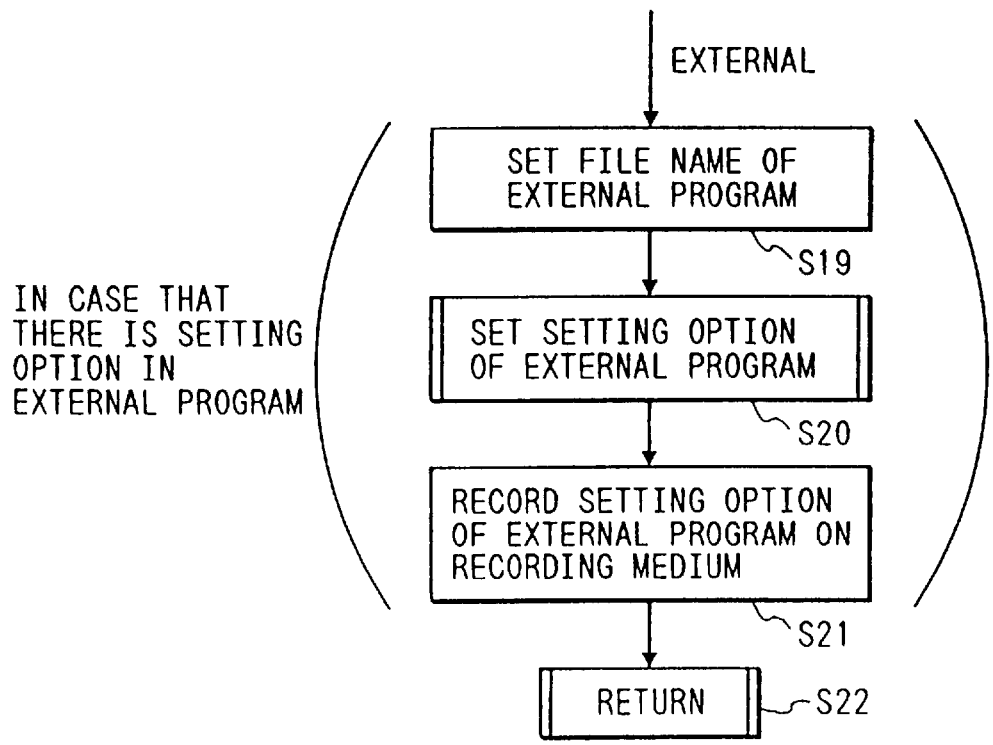
FIG. 5 shows a flow chart continued from FIG. 4.

In S7, if it is the external program, a file name of the externally-supplied program is set (S19, FIG. 5), and if the external program requires a setting option, the option of the external program is set (S20). Then, in S21, the setting option of the external program is recorded on the recording medium and the process returns at S22.

After the settings of the routine of the operation mode 1 have been completed, the settings for the operation modes 2, 3, . . . are performed in a similar fashion (S2, S3).

After the setting of the operation modes 1, 2, 3, . . . have been completed, the setting program on the PC is sent to the camera of the present invention through the cable to write the setting information in the EEPROM in the camera. Then, the setting operation is terminated.

Then, the user manipulates console buttons of the camera of the present invention to choose the operation mode of the camera.

Figure 6:
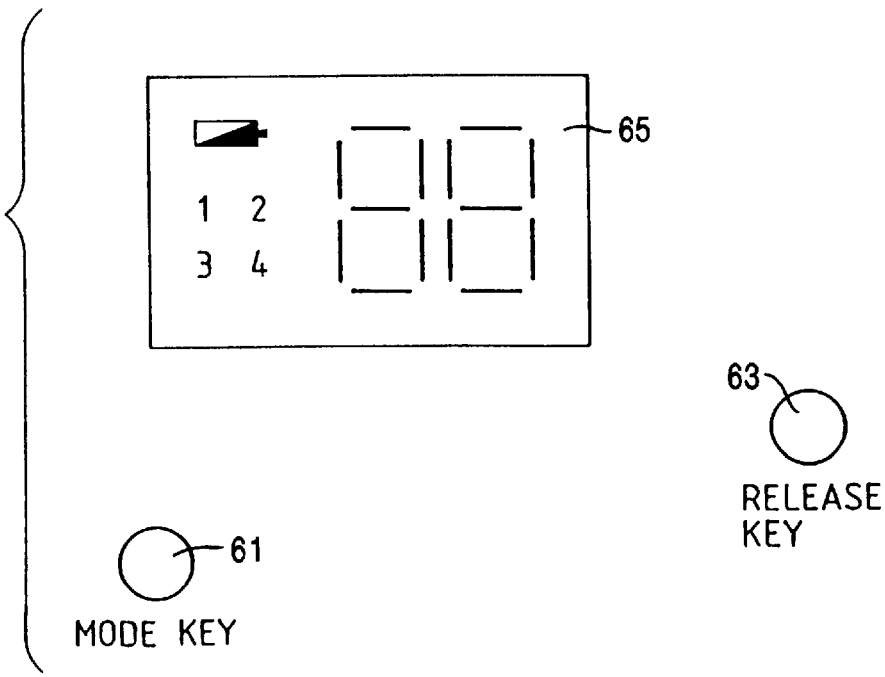
FIG. 6 illustrates a display state.
Figure 7B:
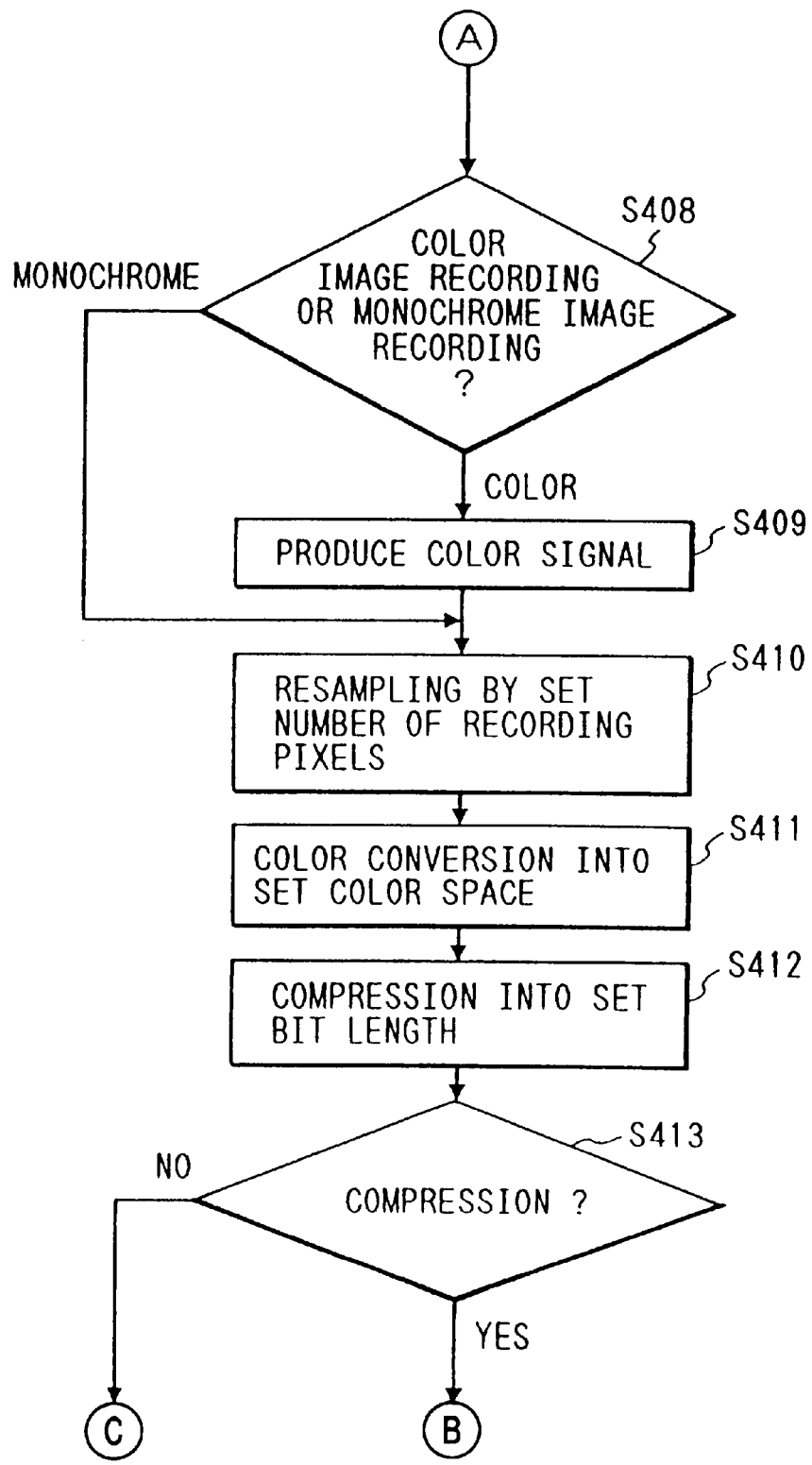
Figure 8:
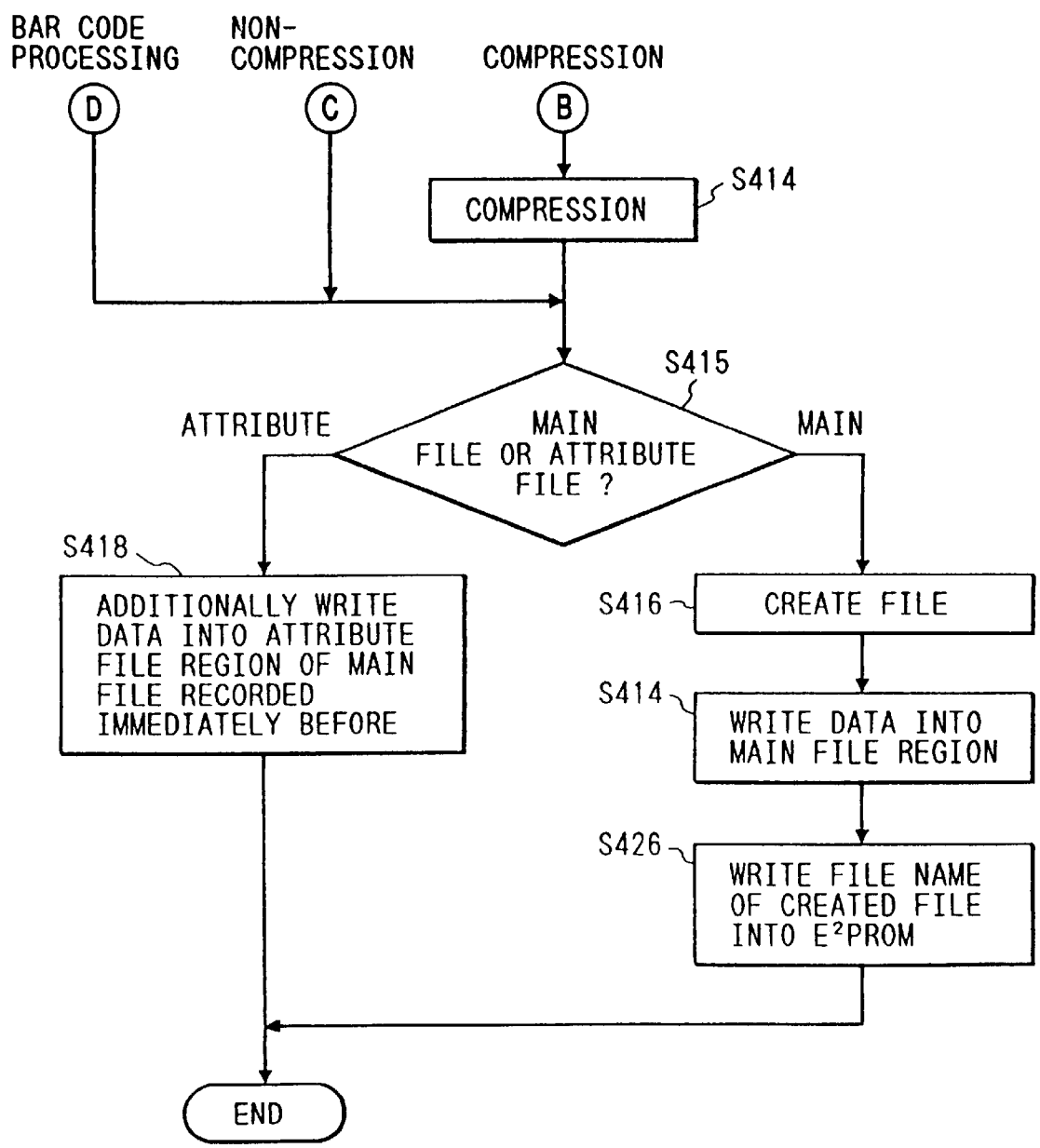
FIG. 8 shows a flow chart continued from FIG. 7.

FIG. 6 shows manipulation buttons 61, 63 and an LCD display panel 65 of the camera. FIGS. 7A, 7B and 8 show flow charts of a camera release operation.

Each time the user depresses mode button 61, segments "1", "2", "3" and "4" (indicating operation modes) are sequentially turned on the LCD panel 65. The user depresses the mode button 61 until a desired operation mode number is turned on to select the operation mode.

When the user depresses the release button 63 (S401) after he/she has set the operation mode, the camera reads out the setting information of the operation mode previously set in the EEPROM (S402) and proceeds with the camera operation in accordance with the setting information.

If the mode is determined to be the built-in program mode in S403 and a natural image recording operation in S404, the built-in program stored in the ROM 7 will be executed and the signal read from the CCD 3 will be processed in accordance with the subsequent set parameters (the number of record pixels, the number of record bits, the compression or non-compression and the compression factor) (S405–S414).

In S405, the CCD 3 makes the exposure, and in S406, the image signal is read out of the CCD 3 and transferred to the RAM 6. Then, in S407, a luminance signal is generated, and in S408, whether it is a color image or a monochromatic image is determined, and if it is a color image, a chrominance signal is generated and a process proceeds to S310. If it is the monochromatic image in S408, the process proceeds directly to S410. In S410, resampling is carried out using a preset number of recorded pixels, and in S411, color conversion to a preset color space is carried out. In S412, the signal is compressed to a preset bit length. If compression is detected in S413, the compression is carried out in S414 and the process proceeds to S415. If no compression is detected in S413, the process proceeds directly to S415.

If the mode is the bar code record mode in S404, the signal read from the CCD 3 is processed for bar code recognition (S419–S422) according to a built-in program code stored in the ROM 7.

In S419, the CCD 3 makes the exposure, and in S420, the image signal is read from the CCD 3 and transferred to the RAM 6. In S421, bar code recognition is carried out and in S422, whether the bar code is to be recorded as video information or not is determined. If YES, the process proceeds to S407. If NO, the process proceeds directly to S415.

Various methods for recording the natural image and recognizing the bar code have been proposed and are known, and they are not discussed in detail herein.

If the mode is the determined to be the externally-supplied program mode in S403, a file name of the external program is read from the EEPROM (S423) and the program of that file name is read from the recording medium 8 and transferred to the 6 (S424), and an entry address of the program is sub-routine called (S425) to shift camera control to the externally-supplied program.

A setting file of the externally-supplied program to be executed is further read from the recording medium 8, as required. When the execution of the externally-supplied program is completed, the return command of the sub-routine is executed to return the control to the camera.

Finally, when it is determined in step S415 that the image signal is to be stored in a main file, the camera records the information processed by the image pick-up on the recording medium as it is, and writes the file name in the EEPROM (S416, S417 and S426).

In S416, the file number or file name is automatically generated, and in S414, the image data is written into the file. In S426, the file number or file name is written into the EEPROM.

When it is determined in step S415 that the image signal is to be stored in an attribute file, it is recorded in the attribute area of the main file recorded in S426 (S418).

Figure 9:
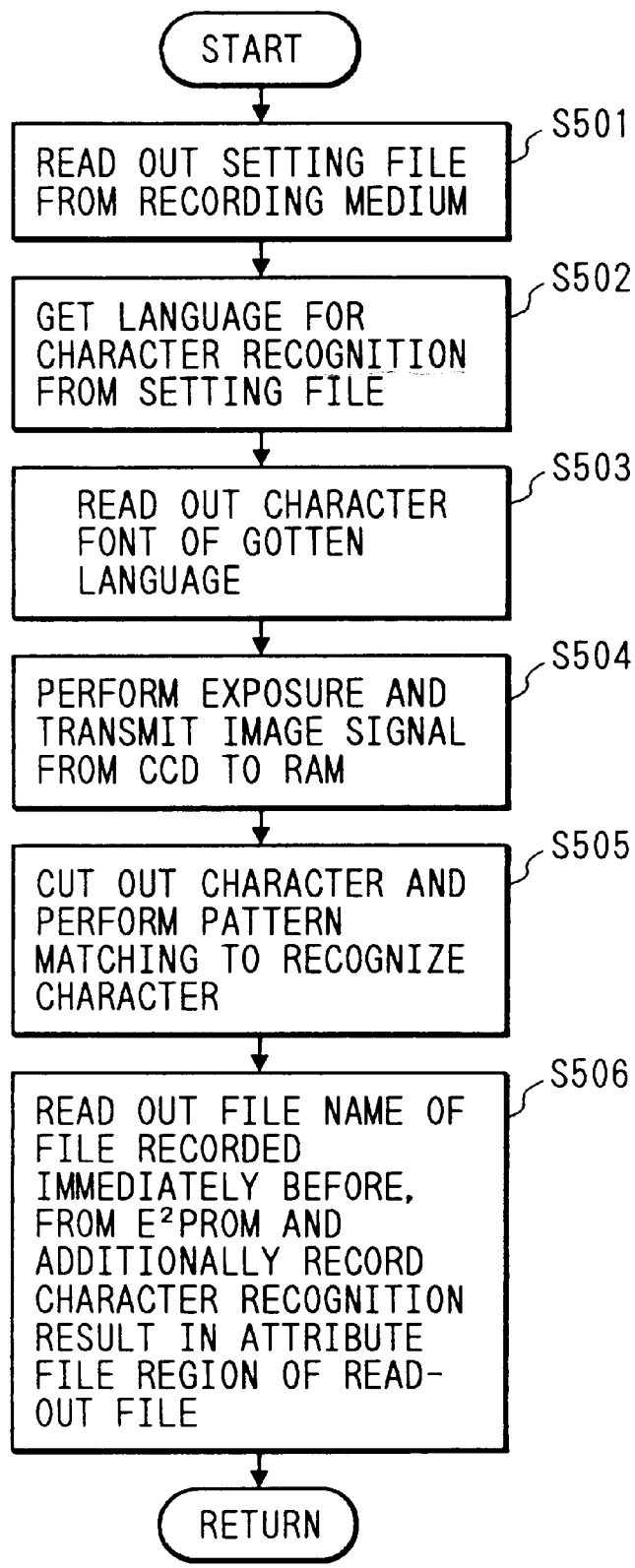
FIG. 9 shows a flow chart of an example of an externally-supplied program.

FIG. 9 shows a flow chart of the operation of the camera when it is executing an externally supplied program (e.g. a character recognition program). Provided to the camera by the PC First, a preset setting file is read from the recording medium 8 (S501). The setting file includes the information preset by the setting program in the PC. Setting information of a language to be character-recognized is acquired (S502) and a file of the font used in that language is read from the recording medium 8 (S503).

Then, the exposure is made and an image signal is transferred from the CCD 3 to the RAM 6 (S504). The characters are then extracted, pattern-matched, recognized and converted to ASCII code, for example (S505).

The file name of the file recorded immediately before is read from the EEPROM 11 (which was written in S426) and the recognized character code is additionally recorded in the attribute area of the file (S506).

In accordance with the present embodiment, the retrieval and management of the image file after the image pick-up are facilitated.

What is claimed is:

1. An electronic camera comprising:

image pickup means for receiving an image and outputting an image signal corresponding thereto;

a connector for receiving from an external source (i) camera mode setting information and (ii) a character recognition program;

a first memory for storing (i) the received camera mode setting information and (ii) a file name of the character recognition program;

a second memory for storing the external source character recognition program received by said connector;

a third memory for storing a built-in photography mode control program;

a designator for designating one of a photography mode and a character recognition mode; and signal processing circuitry for processing the image signal output from said image pickup means (i) as a photograph and in accordance with the camera mode setting information stored in said first memory when said designating means designates the photography mode, and (ii) as character signals when said designating means designates the character recognition mode.

2. A camera according to claim 1, wherein said third memory stores a built-in bar code control program, and wherein said designator designates a bar code mode, and wherein said signal processing circuitry processes the image signal as a bar code signal when said designator designates the bar code mode.

3. Apparatus according to claim 1, further comprising a RAM, and wherein said signal processing circuitry transfers the character recognition program from said second memory to said RAM when said designator designates the character recognition mode.

4. A camera according to claim 1, further comprising a cable for coupling said connector to a personal computer external source.

* * * * *

UNITED STATES PATENT AND TRADEMARK OFFICE
CERTIFICATE OF CORRECTION

PATENT NO. : 6,040,856
DATED : March 21, 2000
INVENTOR(S) : Yuji Sakaegi

It is certified that error appears in the above-identified patent and that said Letters Patent is hereby corrected as shown below:

Assignee: [73]

"Canon Kabushiki Kaisha, Japan" should read --Canon Kabushiki Kaisha, Tokyo, Japan--.

COLUMN 1

Line 33, "purpose photograph-recording" should read --photograph-recording purpose--.

Line 52, "recording" should read -- a recording--.

COLUMN 4

Line 1, "the" (second occurrence) should be deleted.
Line 27, ". Provided" should read --provided--.
Line 28, "PC" should read --PC.--.

UNITED STATES PATENT AND TRADEMARK OFFICE
CERTIFICATE OF CORRECTION

PATENT NO. : 6,040,856
DATED : March 21, 2000
INVENTOR(S) : Yuji Sakaegi

It is certified that error appears in the above-identified patent and that said Letters Patent is hereby corrected as shown below:

COLUMN 6

Line 1, "Apparatus" should read -- A camera--.

Signed and Sealed this

Fifth Day of June, 2001

*Attest:*

*Attesting Officer*

NICHOLAS P. GODICI

*Acting Director of the United States Patent and Trademark Office*